United States Patent
Cohen et al.

(10) Patent No.: US 11,437,102 B1
(45) Date of Patent: Sep. 6, 2022

(54) MEMORY ERASURE USING PROXIMITY HEATERS

(71) Applicant: International Business Machines Corporation, Armonk, NY (US)

(72) Inventors: Guy M. Cohen, Ossining, NY (US); Takashi Ando, Eastchester, NY (US); Nanbo Gong, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/193,015

(22) Filed: Mar. 5, 2021

(51) Int. Cl.
*G11C 13/00* (2006.01)
*G06F 21/62* (2013.01)
*G06F 21/79* (2013.01)
*H01L 45/00* (2006.01)
*H01L 27/24* (2006.01)

(52) U.S. Cl.
CPC .......... *G11C 13/0097* (2013.01); *G06F 21/62* (2013.01); *G06F 21/79* (2013.01); *G11C 13/0004* (2013.01); *H01L 27/2463* (2013.01); *H01L 45/06* (2013.01); *H01L 45/1286* (2013.01); *H01L 45/16* (2013.01); *G06F 2221/2143* (2013.01)

(58) Field of Classification Search
CPC .. G06F 21/62; G06F 21/79; G06F 2221/2143; H01L 27/2463; H01L 45/06; H01L 45/1286; H01L 45/16; G11C 13/0097; G11C 13/0004
USPC .................................................. 365/218, 158
See application file for complete search history.

(56) References Cited

U.S. PATENT DOCUMENTS

| | | | |
|---|---|---|---|
| 7,411,818 B1 | 8/2008 | Elmegreen | |
| 7,675,066 B1 | 3/2010 | Dougherty | |
| 7,982,488 B2 | 7/2011 | Nirschl | |
| 8,816,717 B2 | 8/2014 | Fritz | |
| 8,861,728 B2 | 10/2014 | Chu | |
| 9,941,004 B2 | 4/2018 | Brightsky | |
| 9,978,231 B2 | 5/2018 | Isaacs | |
| 10,535,713 B2 | 1/2020 | Brightsky | |
| 10,592,697 B1* | 3/2020 | Almeida | H04L 9/0897 |
| 10,956,622 B2* | 3/2021 | Choi | G11C 13/0002 |
| 11,068,620 B2* | 7/2021 | Minassian | G06F 21/74 |
| 2004/0151024 A1* | 8/2004 | Fricke | H01L 27/2409 365/177 |
| 2006/0279978 A1 | 12/2006 | Krusin-Elbaum | |
| 2007/0206410 A1* | 9/2007 | Sutardja | G11C 13/0069 365/163 |

(Continued)

FOREIGN PATENT DOCUMENTS

| | | |
|---|---|---|
| CN | 101241926 A | 8/2008 |
| CN | 103779376 A | 5/2014 |

OTHER PUBLICATIONS

Anonymous. "Security Requirements for Cryptographic Modules." Published May 25, 2001. 69 pages. Information Technology Laboratory, National Institute of Standards and Technology, Gaithersburg, MD, USA.

(Continued)

*Primary Examiner* — Michael T Tran
(74) *Attorney, Agent, or Firm* — Heather Johnston

(57) ABSTRACT

A memory array with memory cells may have one or more heaters integrated into the memory array between the memory cells. A processor in communication with the heater may notify the heater to activate when a trigger event occurs.

25 Claims, 10 Drawing Sheets

(56) References Cited

U.S. PATENT DOCUMENTS

| | | | |
|---|---|---|---|
| 2008/0012094 A1* | 1/2008 | Ma | G11B 9/04 |
| | | | 257/614 |
| 2008/0048169 A1* | 2/2008 | Doyle | H01L 45/1666 |
| | | | 257/209 |
| 2008/0186760 A1 | 8/2008 | Elmegreen | |
| 2009/0087945 A1* | 4/2009 | Lee | H01L 45/06 |
| | | | 438/102 |
| 2010/0182147 A1 | 7/2010 | Rueping | |
| 2012/0039117 A1 | 2/2012 | Webb | |
| 2012/0170352 A1* | 7/2012 | Le Neel | G11C 17/18 |
| | | | 365/148 |
| 2013/0121057 A1* | 5/2013 | Le Neel | G11C 13/0007 |
| | | | 365/148 |
| 2013/0146833 A1* | 6/2013 | Russo | H01L 45/144 |
| | | | 257/5 |
| 2013/0187120 A1* | 7/2013 | Redaelli | H01L 45/143 |
| | | | 257/5 |
| 2013/0223173 A1* | 8/2013 | Higashi | G11C 13/0069 |
| | | | 365/189.011 |
| 2013/0320288 A1* | 12/2013 | Redaelli | H01L 23/5256 |
| | | | 257/4 |
| 2013/0343119 A1* | 12/2013 | Redaelli | H01L 45/141 |
| | | | 365/163 |
| 2014/0103957 A1 | 4/2014 | Fritz | |
| 2014/0136852 A1* | 5/2014 | Minassian | G06F 21/74 |
| | | | 713/189 |
| 2015/0043266 A1* | 2/2015 | Youn | G11C 7/14 |
| | | | 365/148 |
| 2017/0229173 A1* | 8/2017 | BrightSky | H01L 45/144 |
| 2019/0067570 A1* | 2/2019 | Tsai | H01L 45/1233 |
| 2019/0067572 A1* | 2/2019 | Tsai | H01L 45/1286 |
| 2020/0058354 A1* | 2/2020 | Slovin | G11C 13/0028 |
| 2020/0058703 A1* | 2/2020 | Slovin | H01L 45/1286 |
| 2020/0273510 A1* | 8/2020 | Mihajlovic | H01F 10/3259 |
| 2021/0089230 A1* | 3/2021 | Mayer | G06F 3/0659 |
| 2021/0134361 A1* | 5/2021 | Wu | H01L 27/2436 |

OTHER PUBLICATIONS

Cabral, Jr., et al., "Novel New Materials and Integration for Irreversible Erasure of Non-Volatile Memory." Published Mar. 12, 2016. 47 pages. Published by International Business Machines Corporation.

Mell, et al., "The NIST Definition of Cloud Computing," Recommendations of the National Institute of Standards and Technology, U.S. Department of Commerce, Special Publication 800-145, Sep. 2011, 7 pgs.

Vasile, et al., "Active tamper detection circuit based on the analysis of pulse response in conductive mesh." Published in 2017. 6 pages. 2017 40th International Spring Seminar on Electronics Technology (ISSE), Sofia, 2017, pp. 1-6. https://ieeexplore.ieee.org/document/8000987.

International Search Report and Written Opinion, International Application No. PCT/CN2022/077442, International filing date Feb. 23, 2022.

* cited by examiner

MEMORY ERASURE USING PROXIMITY HEATERS

BACKGROUND

The present disclosure relates generally to the field of digital memory and, more specifically, to erasing data from memory devices.

Elements of secure computing include authentication, sending data to an authorized source, and/or loading data onto a designated device. Cryptographic keys may be stored in non-volatile memory and be present on an integrated circuit (IC). Unauthorized access may jeopardize the security of the data by extracting the cryptographic keys from the device.

SUMMARY

Embodiments of the present disclosure include a memory system, a method of manufacture therefore, a computer system, a computer program product, and a method for memory erasure. Some embodiments of the present disclosure for memory erasure may include a memory array with memory cells. One or more heaters may be integrated into the memory array between the memory cells. A processor in communication with the heater may notify the heater to activate when a trigger event occurs.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
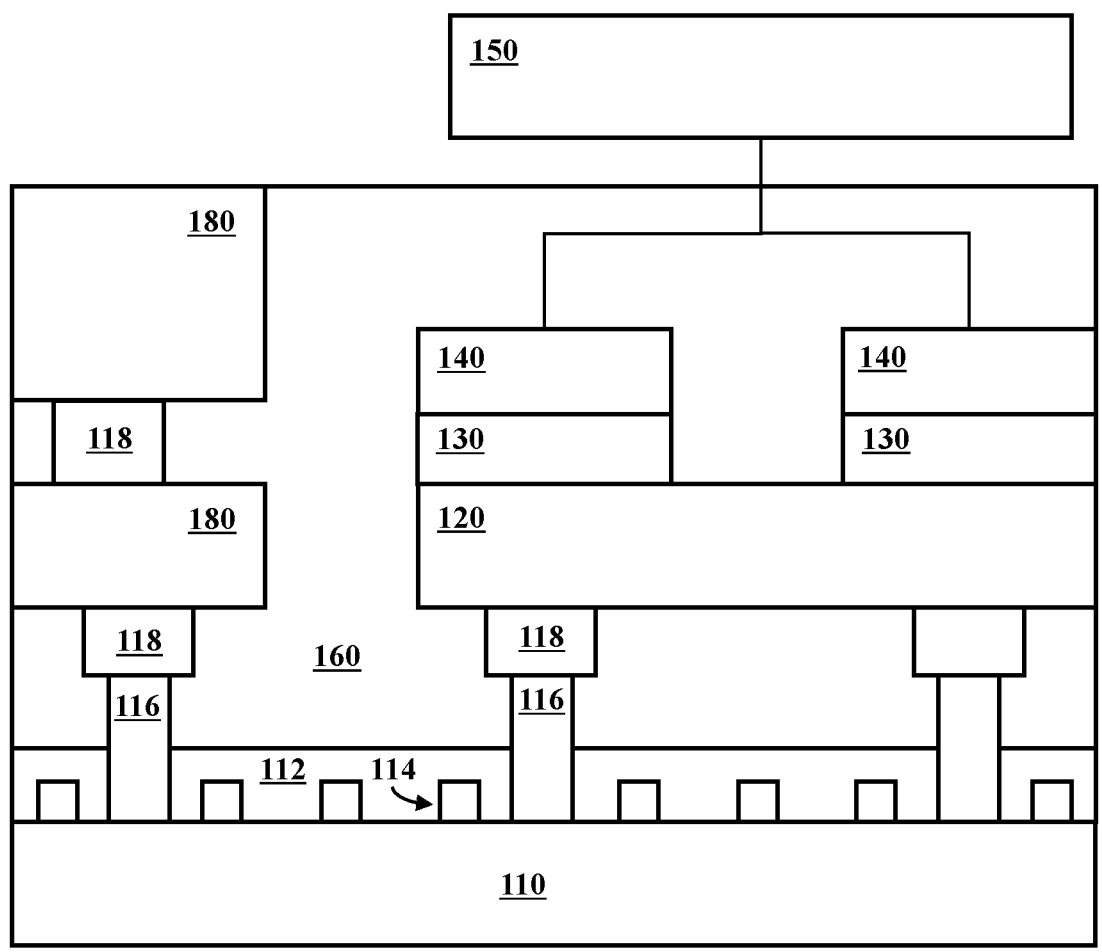
FIG. 1 illustrates an example circuit with integrated memory erasure capability in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of memory and, more specifically, to erasing data from memory devices. Additional aspects of the present disclosure will be apparent to those skilled in the art. Some of these aspects are described further below.

Embodiments of the present disclosure include a memory system, a method of manufacture therefore, a computer system, a computer program product, and a method for memory erasure. Some embodiments may include a memory array with memory cells. One or more heaters may be integrated into the memory array between the memory cells. A processor in communication with the heater may notify the heater to activate when a trigger event occurs.

In some embodiments of the present disclosure, the memory cells may be nonvolatile phase change memory cells. In some embodiments, the activation of the heater changes at least one nonvolatile phase change memory cell from a first phase to a second phase; in some embodiments, the first phase is amorphous and the second phase is crystalline. In some embodiments, the memory cells are encryption memory storing an encryption key.

Some embodiments of the present disclosure include using a material that is both thermally conductive and electrically insulating to separate the heater from the memory cells. In some embodiments, the material is boron nitride or aluminum nitride.

Some embodiments of the disclosure may include a power source capable of providing power to the notification system, the heater, or both. In some embodiments of the present disclosure, the power source may be integrated into the memory system.

In some embodiments of the present disclosure, the processor is a tamper detection unit. In some embodiments of the present disclosure, the tamper detection unit may be embedded into the memory system.

To aid in understanding the present disclosure, FIG. 1 illustrates a cross-sectional view of a memory system 100 with integrated memory erasure capability in accordance with the present disclosure. It is noted before fully describing the figures that like reference numerals are used to designate like parts in the accompanying drawings. The memory system 100 includes a substrate 110 which may be a semiconductor (e.g., crystalline silicon, germanium, gallium arsenide, some other similar material, or some combination thereof). The memory system 100 also includes one or more layers of dielectric 112 and 160 as well as transistors 114. The memory system 100 also includes electrodes 116 and 118 (e.g., tungsten vias and metals such as first-level metals).

The memory system 100 further includes phase-change memory (PCM) 120. One or more heaters 140 may be thermally connected to the PCM 120. A material 130 may separate the heaters 140 from the PCM 120. The material 130 may be thermally conductive to facilitate heat transfer between the heaters 140 and the PCM 120. The material 130 may also be electrically insulating to keep the heaters 140 and the PCM 120 circuits separated. A processor 150 communicates with the heaters 140 if a trigger event occurs to notify the heaters 140 to activate and thereby heat the PCM 120 through the thermally conductive, electrically insulating material 130. The processor 150 may be, for example, a notification unit, a tamper detection unit, or other device which may activate the heaters 140. The processor 150 may activate the heaters 140 as a result of a trigger event.

A trigger event may be used to activate memory erasure. A trigger event may be any occurrence which results in the activation of a certain protocol. In the present disclosure, a trigger event refers to a threshold which may be met to activate a memory erasure. Trigger events may include, for example, reaching the end of a subscription (e.g., the threshold is a date), receiving a manual instruction to delete (e.g., the threshold is a set input value), identifying a tampering attempt (e.g., the threshold is recognition of attempted unauthorized access), or other similar occurrences. Expiration triggers may be tied to external systems (e.g., a remote subscription calendar), internal systems (e.g., dates and/or times entered into a calendar on a local device), or some combination thereof. Tampering attempts may be identified by a number of means including, for example, the removal of a memory module from a rack without providing a proper access code, an attempted bypass of a device enclosure, or other recognition of unauthorized tampering with a device.

Tampering may involve reverse engineering the contents of a memory selection, such as reverse engineering the contents of an encryption key. Many physical reverse engineering techniques require accessing the chip structures through imaging (e.g., electron beams from scanning electron microscopy, focused ion beam, x-ray, et cetera) and therefore generate radiation (e.g., photocurrent, laser beam induced current, electron beam induced current, et cetera). Some embodiments of the present disclosure may exploit this principle by using photovoltaic cells to convert the radiation from a tampering attempt into a current which triggers the tamper response (e.g., powers the heater activation) to erase the data.

Tampering may involve unauthorized physical access (e.g., unsanctioned removal of a computer board from a computer or opening a box containing a computer chip). Tampering may include unauthorized access of a secure room. In some embodiments, sensors may detect an intrusion with sensors; such sensors may include, for example, sensors for light, temperature, humidity, pressure, similar detectors, or some combination thereof.

Tampering may include electrical probing and delayering for extracting secret keys to inducing faults (e.g. flipping states) to force a device to conduct unauthorized operations. An unauthorized access attempt typically deploys a range of techniques to locate specific circuits and structures; these techniques usually involve radiation for imaging or inducing currents and faults. Again, some embodiments of the disclosure may reroute the energy from the radiation or currents to activate an anti-tamper device and erase the targeted memory and/or the memory containing the encryption key for the targeted memory. For example, a photovoltaic cell may automatically capture and reroute energy from a tampering attempt to power the activation of the heaters 140.

Heating the PCM 120 may change the state of the phase change material in the PCM 120 (e.g., from amorphous to crystalline). Changing the state of the phase change material in the PCM 120 changes the data held in the PCM 120. PCM 120 may be heated to change the state of the phase change material in the PCM 120; alternatively, the phase change material in the PCM 120 may be heated and stay in the same state (e.g., if the phase change material in the PCM 120 is already in a crystalline state, it will remain in the crystalline state when heated). PCM 120 cells may be clustered together to contain data. The aggregate data contained in a cluster of PCM 120 cells may be changed by changing the state of the phase change material in one or more of the PCM 120 cells in the cluster; a portion of the PCM 120 cells may retain their original state (e.g., remain in crystalline state). Changing the state of phase change material in one or more of the PCM 120 cells in a cluster alters the aggregate data held by the cluster. Thus, changing the state of the phase change material in the PCM 120 cells within a cluster of PCM 120 cells erases the data contained within the cluster.

Not all PCM 120 cells need to change from one state to another (e.g., from amorphous to crystalline) for data held by the memory cluster to be erased; indeed, some PCM 120 cells may already be in a crystalline state and will remain in the crystalline state if the heaters 140 are activated. The data stored in the memory of a PCM 120 cell cluster may be erased by, for example, resetting some or all of the PCM 120 cells to the amorphous phase or setting all of the cells to a crystalline state.

A memory cell cluster may be any grouping or collection of memory. For example, a cluster of PCM 120 cells may be an array of eight bits of PCM 120. A memory cell cluster may be an array of memory cells, memory chip, a subsection of a memory chip (e.g., a dedicated storage memory section, a section specifically for saving an encryption key, an encoder/decoder, et cetera), a cache, a hard drive, or similar.

The processor 150 may trigger the heaters 140 to activate if a trigger event occurs. The processor 150 may be, for example, a tamper detection unit which may be used to identify attempted unauthorized access to data held by memory protected by the memory system 100. For example, a tamper detection unit may be used to identify unauthorized physical access to a memory chip or unauthorized access to the package of the memory chip.

In some embodiments, the processor 150 may be communicably coupled to a subscription service database such that the expiration of the subscription for a particular user could trigger the notification system to erase the login credentials for that particular user. In some embodiments, the processor 150 may be coupled in a way as to permit a subscription service database to erase specified PCM 120 cells only if a trigger event occurs (e.g., the subscription service database may be physically disconnected from the processor 150 except on preset dates, and on the preset connection dates, the subscription service database may verify subscription status and erase login information for lapsed accounts). In some embodiments, a memory system 100 may not be connected to any external systems such that only on-site access may result in erasure of PCM 120 cells;

preventing external access may be preferred, for example, as a security precaution against unauthorized memory erasure via external access.

The memory system 100 with memory erasure capabilities may be part of, or integrated into, another system. In some embodiments, memory erasure circuits are electrically separated from other parts of a memory chip; for example, a memory erasure circuit may be integrated into a memory chip but not be part of the same circuits as memory storage. As shown, the memory system 100 includes wires 180 which may connect to external memory, an encryption device, an encryption device, a memory reader, a processor register, and/or other components. The memory erasure capabilities of the memory system 100 may be used to protect a larger system and the information it holds by, for example, erasing the memory of PCM 120 cells holding an encryption key. For example, a trigger event may cause an erasure of the memory holding the encryption keys so that data which was encrypted using these keys and is held in the main memory is effectively rendered worthless. In some embodiments, a copy of the encryption key may be retained elsewhere to prevent unauthorized access by preventing decryption as well as protecting the data from becoming useless by erasing the only encryption key.

Encryption keys in accordance with the present disclosure may be used for any encrypted memory system. In some embodiments, the memory system 100 may contain the encryption key for an encrypted database such that erasure of the data held within the memory system 100 prevents an unauthorized user from being able to interpret data pulled from the encrypted database; in such an embodiment, there may exist another copy of the encryption key such that restoration of control of the encrypted database can result in the ability to decrypt and use the database by using the other copy of the encryption key, thus preserving the protection of the encrypted database while simultaneously preventing the data in the encrypted database from being lost as it obviates the need to delete the data in the event of unauthorized access.

Figure 2A:
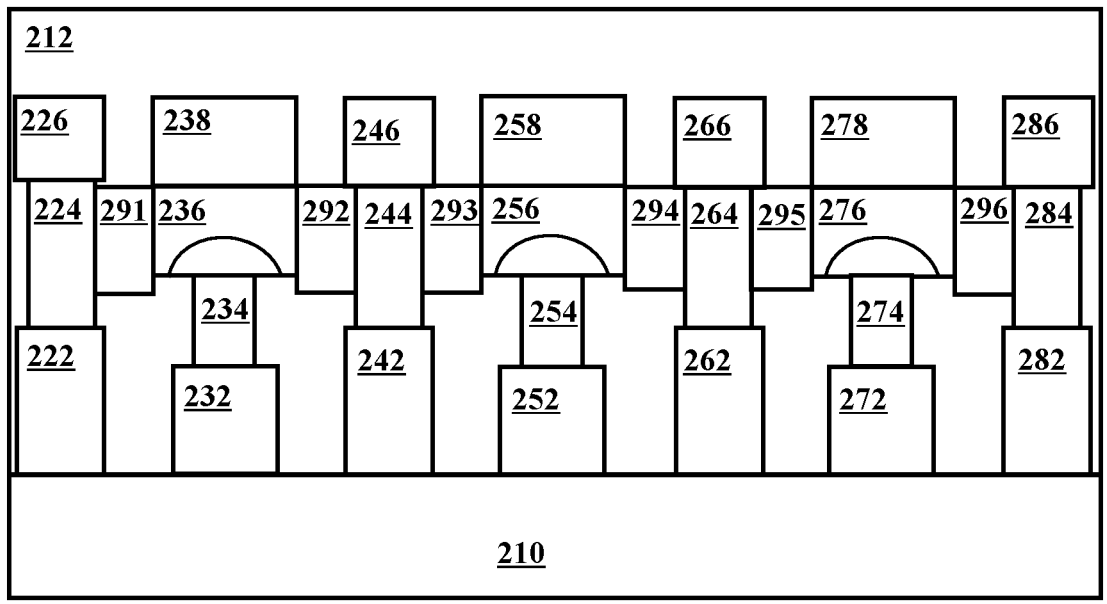
FIG. 2a depicts a side view of an example memory device with integrated memory erasure capability in accordance with embodiments of the present disclosure.
Figure 2B:
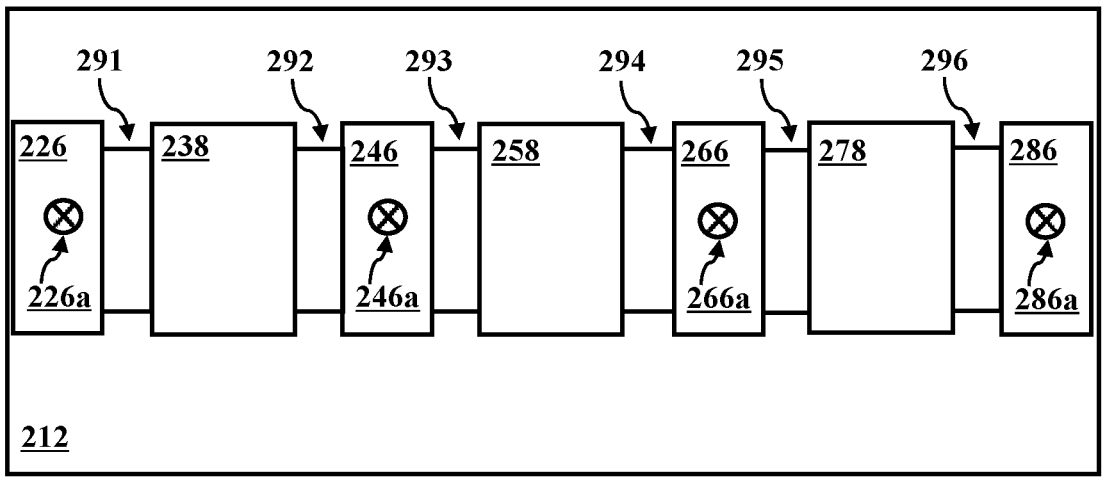
FIG. 2b depicts a top view of a memory device with integrated memory erasure capability in accordance with embodiments of the present disclosure.

FIG. 2a depicts a cross-sectional view of a memory system 200 with integrated memory erasure capability in accordance with embodiments of the present disclosure, and FIG. 2b depicts a top-view of the memory system 200 with integrated memory erasure capability in accordance with embodiments of the present disclosure. The memory system 200 includes a substrate 210 and a dielectric 212. The memory system 200 further includes top electrodes 238, 258, and 278 and bottom electrodes 234, 254, and 274 to the memory elements. The memory system 200 further includes electrodes 222, 226, 242, 246, 262, 266, 282, and 286 to the heaters. and the memory system 200 further includes vias 232, 252, and 272 connecting bottom electrodes 234, 254, and 274 to the substrate 210. The memory system 200 also includes PCM cells 236, 256, and 276, heaters 224, 244, 264, and 284, and material 291, 292, 293, 294, 295, and 296. Material 291, 292, 293, 294, 295, and 296 may be a thermal coupling material.

The heaters 224, 244, 264, and 284 are proximate the PCM cells 236, 256, and 276. The material 291, 292, 293, 294, 295, and 296 is disposed between the heaters 224, 244, 264, and 284 and the PCM cells 236, 256, and 276. The material 291, 292, 293, 294, 295, and 296 may be thermally conductive to facilitate heating of the PCM cells 236, 256, and 276 by the heaters 224, 244, 264, and 284. The material 291, 292, 293, 294, 295, and 296 may be electrically insulating to keep the heaters 224, 244, 264, and 284 circuitry isolated and separated from the PCM cells 236, 256, and 276. Electrically insulating the heaters 224, 244, 264, and 284 from the PCM cells 236, 256, and 276 may prevent writing, re-writing, or over-writing data on the memory system via the heaters 224, 244, 264, and 284 either inadvertently or intentionally (e.g., a back door used for authorized access). The material 291, 292, 293, 294, 295, and 296 may be, for example, boron nitride, aluminum nitride, diamond, another thermally conductive and/or electrically insulating material, or some combination thereof.

Electricity flow 226a, 246a, 266a, and 286a is indicated as transferring electricity through electrodes 226, 246, 266, and 286. Electricity is shown as moving through the top electrodes 226, 246, 266, and 286. In this embodiment, electricity moves through the top electrodes 226, 246, 266, and 286, through the heaters 224, 244, 264, and 284, through the bottom electrodes 222, 242, 262, and 282, and through the substrate 210. Notably, the electrical current may flow in other directions in accord with the present disclosure (e.g., from top electrode through the heater to the bottom electrode, or in a perpendicular direction crossing through the heater) such that the heaters 224, 244, 264, and 284 are powered via a power source and thus able to heat the PCM cells 236, 256, and 276 when activated. In some embodiments, current directionality is unimportant if the heaters are implemented using resistive elements.

In a cluster of PCM cells 236, 256, and 276, each cell may be heated individually (e.g., only one or one at a time), in clusters (e.g., heating one heater adjacent multiple PCM memory cells), sequentially (e.g., a first PCM cell, then a second PCM cell, et cetera), or simultaneously (e.g., all of the PCM cells 236, 256, and 276 in the cluster at once). Simultaneous heating of the PCM cells 236, 256, and 276 in a system may be used as a rapid response to a trigger event. For example, simultaneous heating throughout a PCM cluster may require as little as ten (10) nanoseconds to erase the data contained by the PCM cluster. Simultaneous erasure may be a preferred response to a trigger event as it may provide the fastest response and require less power per heater to achieve a full erasure of the array.

The anneal time, or the time required to fully crystallize the phase change material, of the PCM cells 236, 256, and 276 depends on the phase change material used in the cell as well as the intensity of the current pulse. Typical times in commonly used phase change materials are less than one microsecond. Materials used for the various components of the memory system 200 containing the PCM cluster may impact the time necessary to erase the data held by the PCM cluster. The use of certain materials for the various components of the memory system 200 containing the PCM cluster to be erased may result in requiring three hundred (300) nanoseconds for full erasure of the PCM cluster data.

To crystallize the phase change material, the temperature of the PCM cells 236, 256, and 276 should exceed the crystallization temperature of the phase change material. For example, the crystallization temperature for $Ge_2Sb_2Te_5$ (GST 225) is about 170° Celsius. GST 225 may be doped with elements such as nitrogen, oxygen, or carbon. This doping can change the crystallization temperature. Oxygen doping can lead to a GST 225 crystallization temperature exceeding 200° Celsius; carbon doping can push the crystallization temperature up to about 300° Celsius. A higher crystallization temperature is sometimes needed if the memory is to operate in a hot environment such as in automobiles. The PCM cells 236, 256, and 276 are components of the memory system 200 and, thus, the materials of the PCM cells 236, 256, and 276 may impact the time required for erasing the data in the PCM cluster. The time required must be sufficient to heat the PCM cells 236, 256, and 276 to a temperature high enough to result in a crystalline phase. Attaining a temperature sufficient for the PCM cells 236, 256, and 276 to reach crystalline phase depends on the materials used for the PCM cells 236, 256, and 276. In general, given standard atmospheric conditions, the PCM cells 236, 256, and 276 should reach approximately 200° Celsius to attain crystalline phase.

The time and energy required to heat the PCM cells 236, 256, and 276 to a sufficient temperature will further depend on the heaters 224, 244, 264, and 284 and the heat capacity of the materials used to construct the memory system 200. Specifically, the heaters 224, 244, 264, and 284 may be placed in a variety of orientations and geometries about the memory cell 200 which may impact the time required to heat the PCM cells 236, 256, and 276; in general, the closer in proximity the heaters 224, 244, 264, and 284 are to the PCM cells 236, 256, and 276, the greater the density of heaters 224, 244, 264, and 284, and the more effective the orientations of the heaters 224, 244, 264, and 284 are with respect to heat transfer to the PCM cells 236, 256, and 276, the less the amount of time required to achieve crystalline phase for the PCM cells 236, 256, and 276. Time required to anneal the PCM cells 236, 256, and 276 may be minimized by applying a strong electrical pulse to the heaters 224, 244, 264, and 284 and thereby increase the heat output of the heaters 224, 244, 264, and 284.

Further, the heaters 224, 244, 264, and 284 may be set to achieve various temperatures upon being triggered; the higher temperature the heaters 224, 244, 264, and 284 reach, the less the time required to achieve crystalline phase for the PCM cells 236, 256, and 276. In any case, the PCM cells 236, 256, and 276 need only reach crystalline phase; achieving any temperature beyond that which is required to reach crystalline phase represents energy wasted because it does not achieve goals related to memory erasure. Additionally, PCM cells 236, 256, and 276 should be prevented from attaining a temperature greater than 600° Celsius because the PCM cells 236, 256, and 276 are likely to become unusable as a result of overheating. To preserve the reusability of the memory, the PCM cells 236, 256, and 276 generally should not be heated in excess of 400° Celsius for extended periods of time.

As energy transfer requires time, the heaters 224, 244, 264, and 284 may be heated above and beyond 600° Celsius to achieve a faster heating of the PCM cells 236, 256, and 276. In some embodiments, the heaters 224, 244, 264, and 284 may achieve a "flash" temperature to quickly heat the PCM cells 236, 256, and 276 to crystalline phase. A flash temperature is a temperature which may be reached for a short period of time such that the heat does not dissipate to the surrounding material quickly enough for the surrounding material to reach the same temperature. Heaters 224, 244, 264, and 284 may be set to achieve a flash temperature to more quickly transfer enough energy to the PCM cells 236, 256, and 276 to enable the PCM cells 236, 256, and 276 to reach crystalline phase faster than would otherwise be achievable. For example, the heaters 224, 244, 264, and 284 may reach a flash temperature of 800° Celsius for a period of time long enough to permit the PCM cells 236, 256, and 276 to reach 200° Celsius and not long enough for the PCM cells 236, 256, and 276 to reach 600° Celsius.

Depending on the materials of the memory cell 200 and the flash temperature, the heaters 224, 244, 264, and 284 may only need to be activated for a period of time less than the time required for the to achieve crystalline phase for the PCM cells 236, 256, and 276. For example, if the heaters 224, 244, 264, and 284 achieve a high enough flash temperature, the heaters 224, 244, 264, and 284 may only need to be active for three (3) nanoseconds to transfer enough energy for the PCM cells 236, 256, and 276 to achieve a sufficient temperature over the course of ten (10) nanoseconds to attain crystalline phase.

In some embodiments, one or more power sources (not shown) may be communicably coupled to the memory system 200. A power source may transfer power to the heaters 224, 244, 264, and 284 via the same connection as used to communicate a trigger event, a connection used solely for power transfer, or some combination thereof. In some embodiments, one or more power sources may be embedded in the memory system 200 to provide power to the memory system 200. A power source may be embedded in the memory system 200 and communicably coupled to the heaters 224, 244, 264, and 284 to power the heaters 224, 244, 264, and 284 such that the heaters 224, 244, 264, and 284 may draw power from the power source when activated to enable the heaters 224, 244, 264, and 284 to reach a certain temperature. Power sources may include, for example, batteries, photovoltaic cells, fuel cells, electrical connections, or other units capable of providing power. In some embodiments, power sources may be capable of storing power (e.g., batteries) in addition to being able to provide power.

Heaters 224, 244, 264, and 284 are integrated into the memory system 200. A heater 224, 244, 264, and 284 may be any source of heat. In some embodiments, heaters 224, 244, 264, and 284 may preferably be reusable sources of heat such that the heaters 224, 244, 264, and 284 are capable of heating the PCM cells 236, 256, and 276 more than once. Heaters 224, 244, 264, and 284 may be proximity heaters embedded into the memory system 200. Heaters 224, 244, 264, and 284 may be, for example, interdigitated between material 291, 292, 293, 294, 295, and 296 and/or PCM cells 236, 256, and 276. Examples of resistive heater materials may include Tan, Tin, and carbon.

In some embodiments, a single heater 224, 244, 264, or 284 may be used for a memory array. The heater 224, 244, 264, or 284 is proximate to the one or more PCM cells 236, 256, and/or 276 which it is particularly disposed to heat to annealing temperature. In general, in otherwise similar builds of a memory system 200, a greater density of heaters 224, 244, 264, and 284 may result in a faster anneal time. Similarly, the closer the PCM cells 236, 256, and 276 are to a source of heat, the faster the PCM cells 236, 256, and 276 will anneal if a trigger event occurs. Thus, typically, the more heat sources and the closer the heat sources are to the PCM cells 236, 256, and 276, the faster the anneal time.

Additional embodiments, such as other memory system designs and geometries, a method of manufacture, and a use are further discussed herein.

Figure 3A:
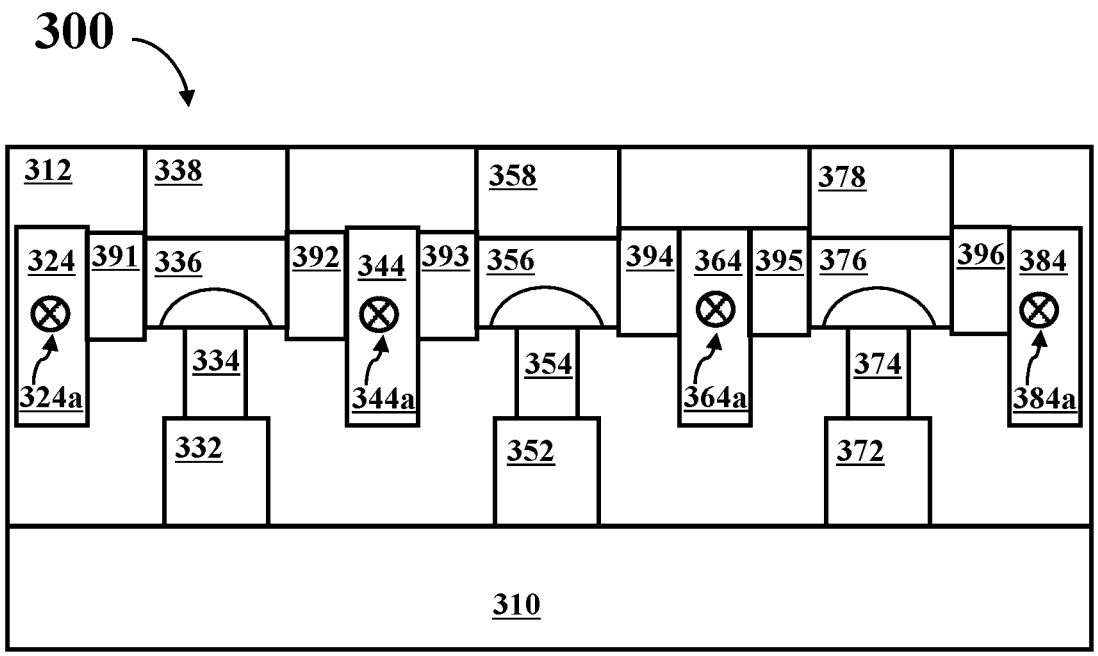
FIG. 3a illustrates a side view of an example memory device with integrated memory erasure capability in accordance with embodiments of the present disclosure.
Figure 3B:
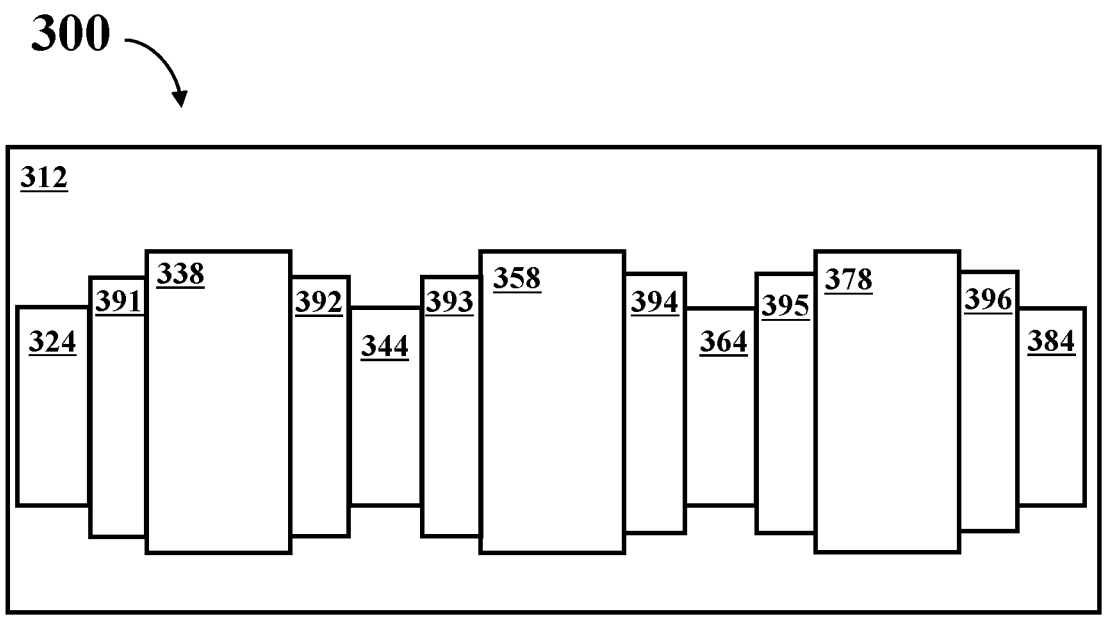
FIG. 3b illustrates a top view of a memory device with integrated memory erasure capability in accordance with embodiments of the present disclosure.

FIG. 3a illustrates a cross-sectional view of a memory system 300 with integrated memory erasure capability in accordance with embodiments of the present disclosure. FIG. 3b illustrates a top view of the memory system 300 with integrated memory erasure capability in accordance with embodiments of the present disclosure. The memory system 300 includes a substrate 310 and a dielectric 312. The memory system 300 further includes electrodes 332, 334, 338, 352, 354, 358, 372, 374, and 378. The memory system 300 also includes PCM cells 336, 356, and 376, heaters 324, 344, 364, and 384, and material 391, 392, 393, 394, 395, and 396. Material 391, 392, 393, 394, 395, and 396 may be used to thermally conduct heat between heaters 324, 344, 364, and 384 and PCM cells 336, 356, and 376. Material 391, 392, 393, 394, 395, and 396 may be used to electrically insulate PCM cells 336, 356, and 376 from heaters 324, 344, 364, and 384.

The heaters 324, 344, 364, and 384 are proximate the PCM cells 336, 356, and 376. The material 391, 393, 394, 395, and 396 is disposed between the heaters 324, 344, 364, and 384 and the PCM cells 336, 356, and 376. The material 391, 392, 393, 394, 395, and 396 may be thermally conductive to facilitate heating of the PCM cells 336, 356, and 376 by the heaters 324, 344, 364, and 384. The material 391, 392, 393, 394, 395, and 396 may be electrically insulating to prevent the heaters 324, 344, 364, and 384 from writing, re-writing, or over-writing data on the memory system 300.

Electricity flow 324a, 344a, 364a, and 384a is indicated as transferring energy to and/or through the heaters 324, 344, 364, and 384. The direction of the flow of electricity is noted as traveling up through the page from the heaters 324, 344, 364, and 384; notably, the electrical current may flow in other directions in accord with the present disclosure (e.g., down through the page or parallel to the page) such that the heaters 324, 344, 364, and 384 are powered via a power source and thus able to heat the PCM cells 336, 356, and 376 when activated. PCM cells 336, 356, and 376 may be heated individually, sequentially, or simultaneously. Simultaneous heating of the PCM cells 336, 356, and 376 in a system may be used as a rapid response to a trigger event.

Figure 4A:
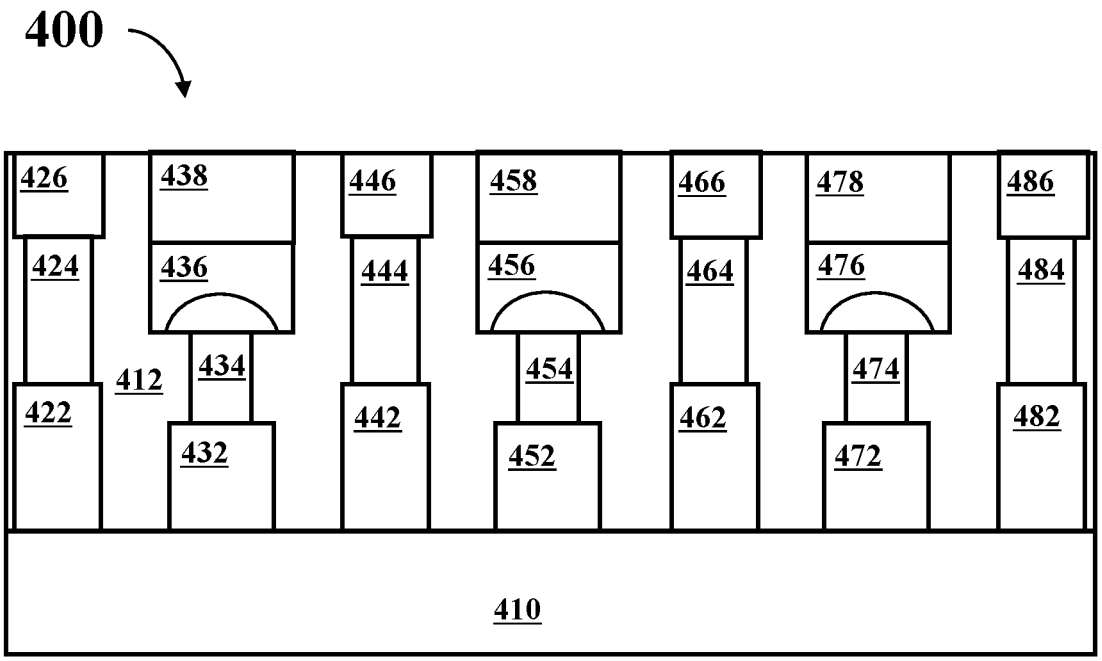
FIG. 4a depicts a side view of an example memory device with integrated memory erasure capability in accordance with embodiments of the present disclosure.
Figure 4B:
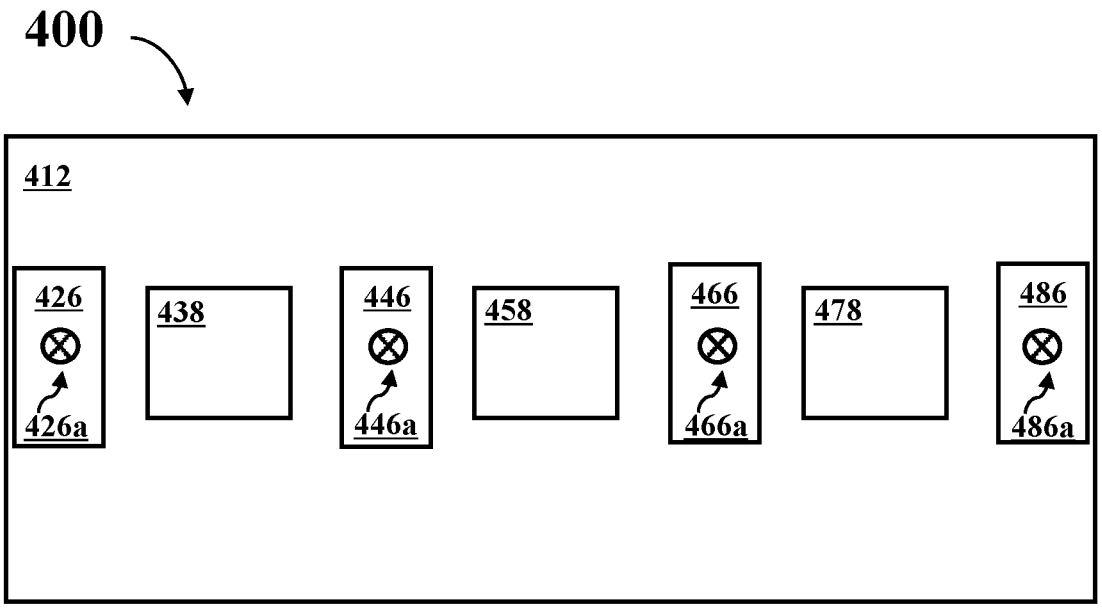
FIG. 4b depicts a top view of a memory device with integrated memory erasure capability in accordance with embodiments of the present disclosure.

In some embodiments, the material between the heaters and the PCM cells may be excluded. FIG. 4a depicts a cross-sectional view of a memory system 400 with integrated memory erasure capability in accordance with embodiments of the present disclosure. FIG. 4b depicts a top view of the memory system 400 with integrated memory erasure capability in accordance with embodiments of the present disclosure. The memory system 400 includes a substrate 410 and a dielectric 412. The memory system 400 further includes electrodes 422, 426, 432, 434, 438, 442, 446, 452, 454, 458, 462, 466, 472, 474, 478, 482, and 486. The memory system 400 also includes PCM cells 436, 456, and 476 and heaters 424, 444, 464, and 484.

The heaters 424, 444, 464, and 484 are proximate the PCM cells 436, 456, and 476. Electricity flow 426a, 446a, 466a, and 486a is indicated as transferring energy through electrodes 426, 446, 466, and 486. Electrical current may flow in various directions in accord with the present disclosure such that the heaters 424, 444, 464, and 484 are powered via a power source and thus able to heat the PCM cells 436, 456, and 476 when activated. PCM cells 436, 456, and 476 may be heated individually, sequentially, or simultaneously. Simultaneous heating of the PCM cells 436, 456, and 476 in a system may be used as a rapid response to a trigger event.

In memory system 400, there is no material between the heaters 424, 444, 464, and 484 and the PCM cells 436, 456, and 476. In such embodiments, the thermal conductivity may be lower such that additional energy may be required to heat the PCM cells 436, 456, and 476 to a crystalline state. Additionally, embodiments without electrically resistant material between the heaters 424, 444, 464, and 484 and the PCM cells 436, 456, and 476 may be more prone to writing, re-writing, and/or over-writing data on the memory system 400.

Figure 5A:
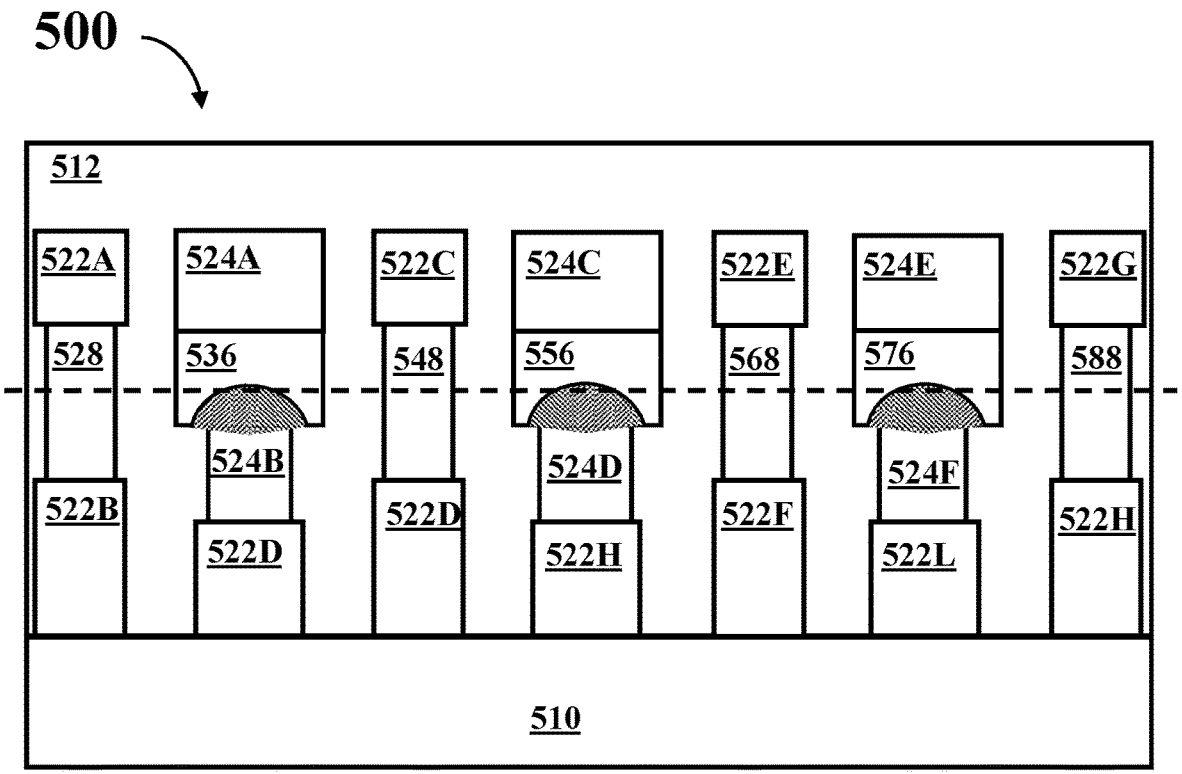
FIG. 5a illustrates a cross-sectional side view of an example memory device with integrated memory erasure capability in accordance with embodiments of the present disclosure.
Figure 5B:
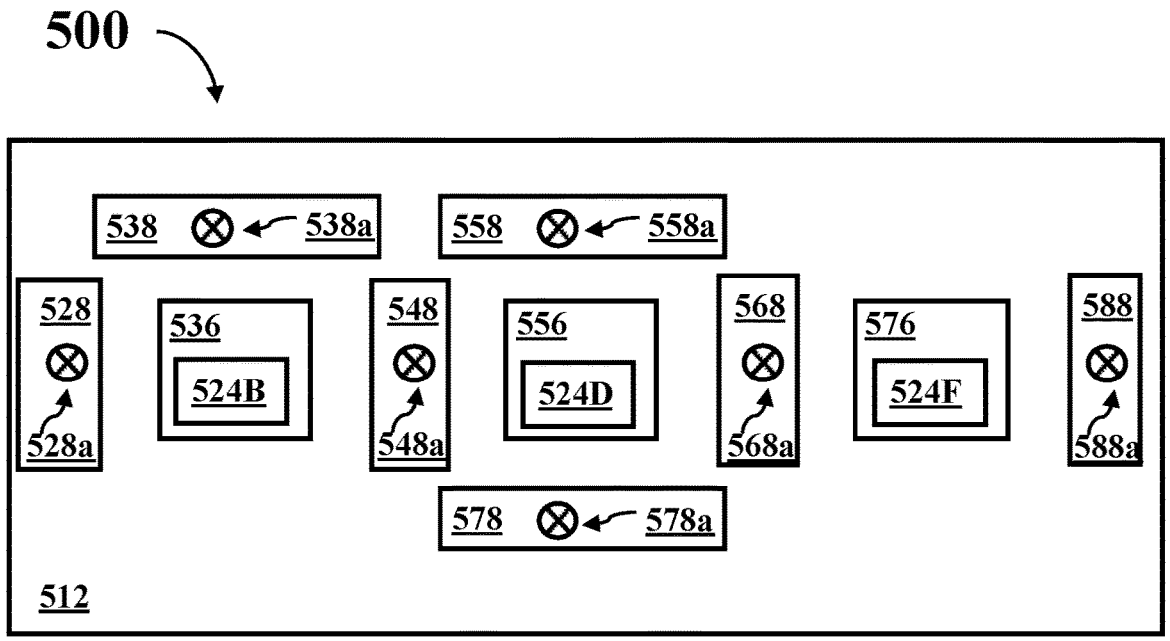
FIG. 5b illustrates a top cross-sectional view of a memory device with integrated memory erasure capability in accordance with embodiments of the present disclosure.

FIG. 5a illustrates a cross-sectional side view of a memory system 500 with integrated memory erasure capability in accordance with embodiments of the present disclosure. FIG. 5b illustrates a top cross-sectional view of the memory system 500 with integrated memory erasure capability in accordance with embodiments of the present disclosure; the cross-section view depicted in FIG. 5b is indicated by the dashed line in FIG. 5a. The memory system 500 includes a substrate 510 and a dielectric 512. The memory system 500 further includes metal lines (interconnects) and vias 522A-H and electrodes 524A-F. The memory system 500 also includes PCM cells 536, 556, and 576; and heaters 528, 548, 568, and 588. The heaters 528, 548, 568, and 588 are proximate the PCM cells 536, 556, and 576 with the dielectric 512 disposed between them. In some embodiments, a thermally coupling material that is thermally conductive and electrically insulating may be disposed between heaters 528, 548, 568, and 588 and the PCM cells 536, 556, and 576. For an example where a thermally coupling material is used see material 291-296 in FIG. 2a.

Current flow 528a, 538a, 548a, 558a, 568a, 578a, and 588a is indicated as into the page through heaters 528, 538, 548, 558, 568, 578, and 588. In some embodiments, current may flow in various directions in accord with the present disclosure such that the heaters 528, 538, 548, 558, 568, 578, and 588 are powered via a power source. When resistive elements are used to implement the heaters 528, 538, 548, 558, 568, 578, and 588 the current flow directionality has no impact on the heat produced by the heater. FIG. 5b is depicting various geometries for placement of the heaters with respect to the PCM memory cells. In one embodiment, the heaters 568 and 588 are adjacent to two opposing faces of PCM cell 576. In another embodiment, the heaters 528, 538 and 548 are adjacent to three of the faces of PCM cell 536. And yet in another embodiment, heaters 548, 558, 568 and 578 are adjacent to four faces of PCM cell 566 (an all-around heating). Also noted is that when the PCM cells 536, 556, 576 are arranged in an two dimensional array, each one of the four heaters 548, 558, 568, 578 surrounding a PCM cell 536, 556, 576 is also shared with another PCM cell 536, 556, 576 (with the exception of the PCM cells at the edge of the array).

Embodiments of the present disclosure include a method for memory erasure. Some embodiments may include a monitoring of a memory array by a processor; the memory array may have a plurality of memory cells. The method may further include determining that a trigger threshold has been exceeded. The processor may communicate to the at least one heater that the trigger threshold was exceeded, and the method may further include heating at least one of the memory cells with at least one heater disposed between the memory cells. In some embodiments of the present disclosure, the memory cells may include a nonvolatile phase change memory cell. In some embodiments of the disclosure, the heating may anneal the phase change memory cell.

Embodiments of the present disclosure include a method of manufacture of a memory system with erasure capabilities. Some embodiments may include forming a non-volatile memory cell on top of a first electrode embedded in a dielectric material and forming a heater on top of a second electrode embedded in the dielectric material. The heater may be proximate the non-volatile memory cell. The method may further include forming a first top electrode on top of the non-volatile memory cell and forming a second top electrode on top of said heater.

Figure 6:
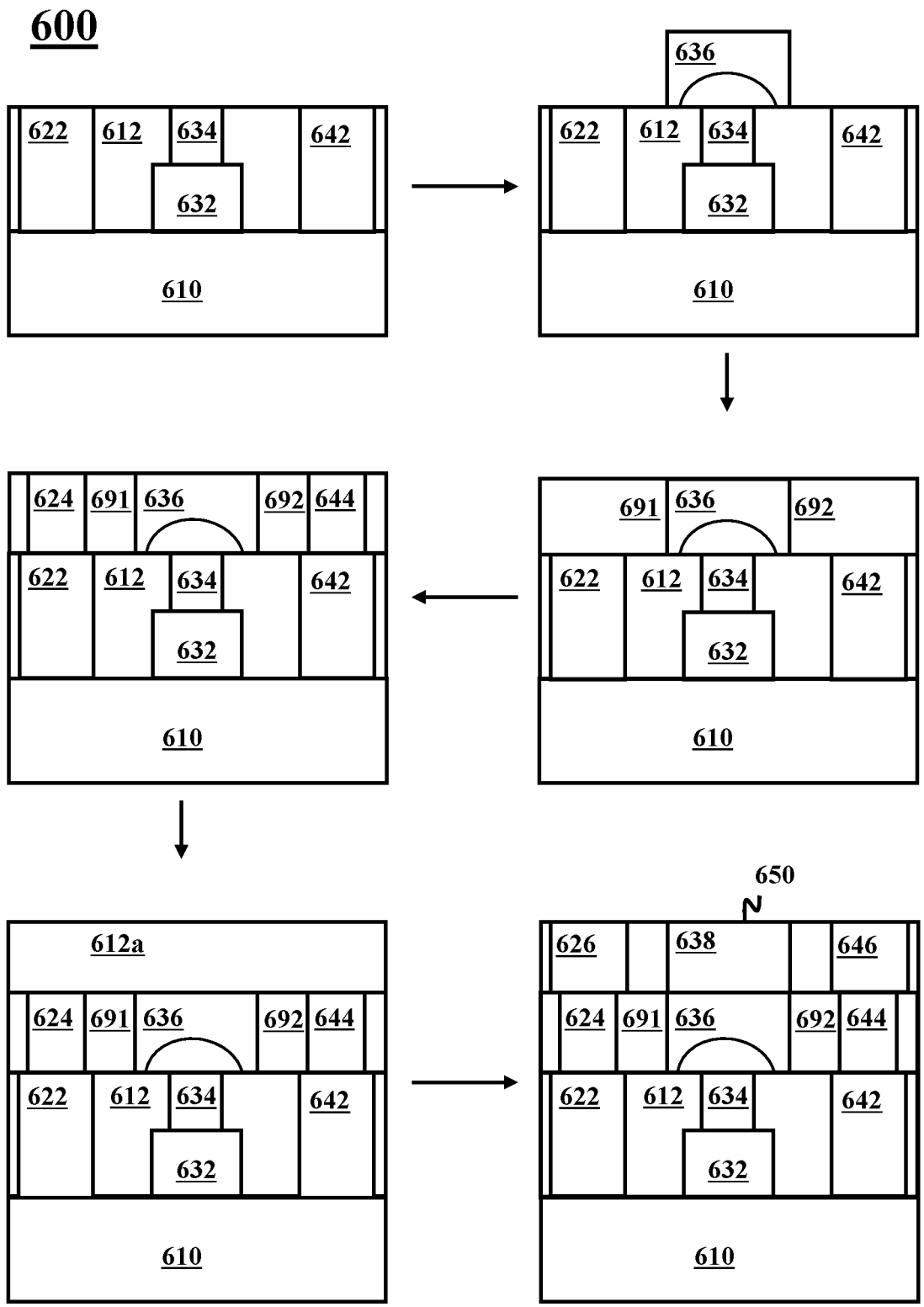
FIG. 6 depicts a method of manufacture of an example memory device with integrated memory erasure capability in accordance with embodiments of the present disclosure.

FIG. 6 depicts a method of manufacture 600 of an example memory system 650 with integrated memory erasure capability in accordance with embodiments of the present disclosure. A substrate 610 may be provided, and electrodes 622, 632, 634, and 642 may be formed in a dielectric 612 using known processing techniques such as lithography, reactive ion etching, metal deposition, and chemical mechanical polishing. A non-volatile memory cell 636 (e.g., a PCM) may be added atop one of the electrodes 622, 632, 634, or 642 (as depicted, electrode 634). Material 691 and 692 may be added around the memory cell 636; the material 691 and 692 may be thermally conductive and electrically insulating. To form the one or more heaters 624 and 644, the one or more heaters 624 and 644 may be embedded in the material 691 and 692. Additional dielectric 612a may be added. Top electrodes 626, 638, and 646 may be formed in dielectric 612a.

Figure 7:
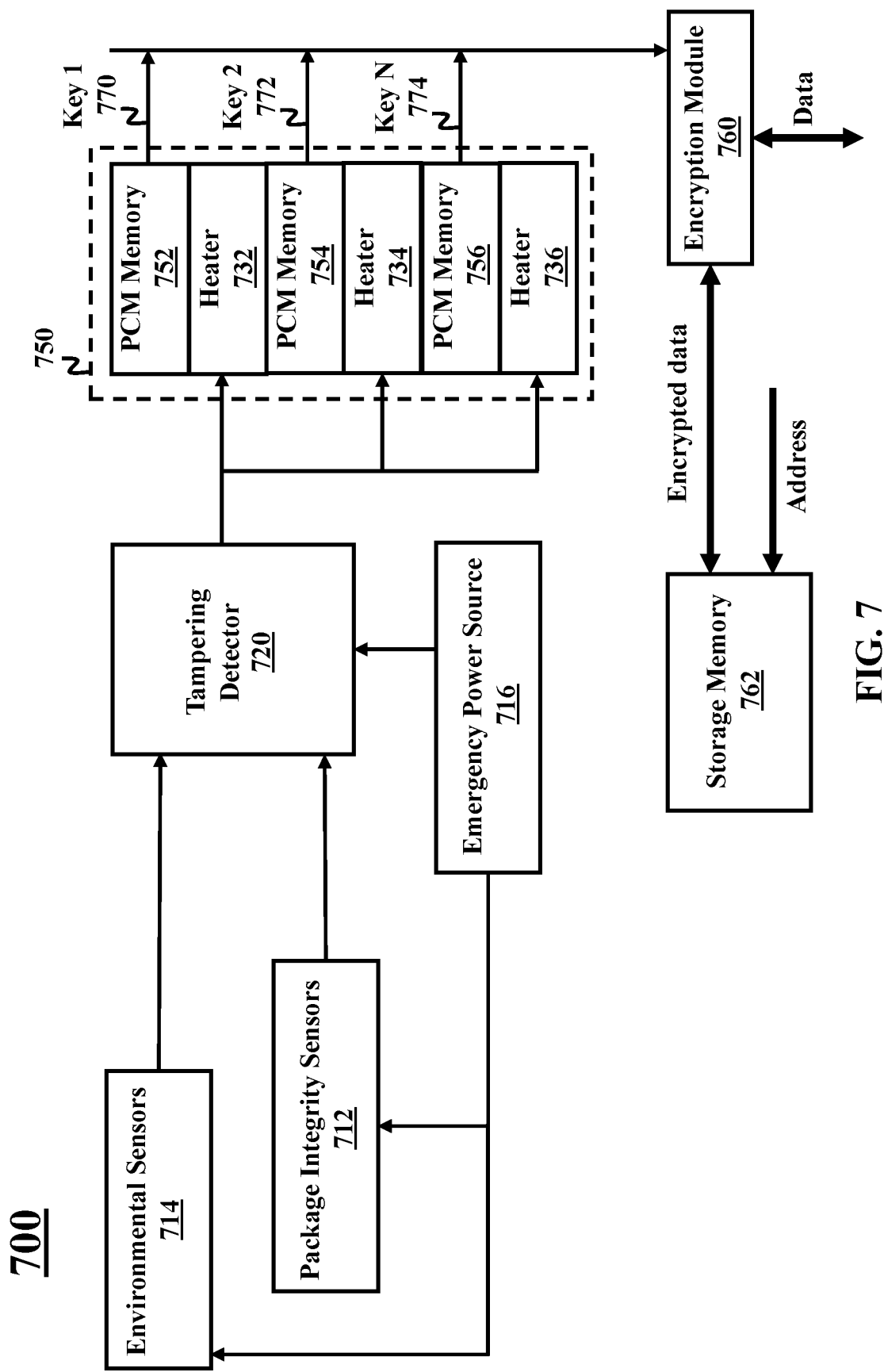
FIG. 7 illustrates a memory erasure system in accordance with embodiments of the present disclosure.

FIG. 7 illustrates a memory system 700 with erasure capabilities in accordance with embodiments of the present disclosure. The memory system 700 may include one or more package integrity sensors 712 and one or more environmental sensors 714. Package integrity sensors 712 may be able to detect physical tampering with a device such as by, for example, identifying an attempt to bypass a device enclosure. Environmental sensors 714 may be able to detect changes to the environment of the device, for example, removal of a device from a memory rack by detecting a change in velocity, rotational motion, stability, ambient temperature, and/or ambient humidity. In some embodiments, an authorization code may be used to identify authorized access, such as authorized maintenance which may require a device enclosure bypass and/or removal from a certain environment.

An emergency power sources 716 may provide energy to package integrity sensors 712 and/or environmental sensors 714. The emergency power source 716 may also provide power, either directly or indirectly, to a tampering detector 720. The tampering detector 720 may be, for example, a notification device (e.g., relaying an input command), a tampering detection unit (e.g., an anti-tamper device), a unit for identifying certain events (e.g., subscription expiration), a combination thereof, or any other unit which may be used to identify trigger events. The tampering detector 720 may be in communication with the package integrity sensors 712 and the environmental sensors 714 such that the tampering detector 720 receives information from the package integrity sensors 712 and the environmental sensors 714.

Some embodiments of the present disclosure include an anti-tamper device for detecting physical tampering as well as for providing a tamper response by erasure of data. Erasure of the memory cluster 750 erases any data, including encryption keys 770, 772 and 774, stored within the memory cluster 750. Erasing an encryption key stored within the memory cluster 750 prevents encryption module 760 from decrypting the data using the encryption keys. In some embodiments, such a memory cluster 750 may be implemented using PCM memories 752, 754, and 756 and (proximity) heaters 732, 734, and 736 as discussed in reference to FIG. 2; for example, the processor 720 may activate the heaters 732, 734, and 736 embedded between the PCM memories 752, 754, and 756 to erase the data contained in a memory cluster.

The tampering detector 720 may further be in contact with one or more heaters 732, 734, and 736. In some embodiments (not shown), the heaters 732, 734, and 736 may abut a thermally coupling material that may be thermally conductive to facilitate efficient heat energy transfer from the heaters 732, 734, and 736 to the PCM memories 752, 754, and 756. In such an embodiment, the thermally coupling material may be electronically insulating to prevent electronic pulses being passed between the heaters 732, 734, and 736 and the PCM memories 752, 754, and 756.

The PCM memories 752, 754, and 756 may be in contact with the encryption module 760. The PCM memories 752, 754, and 756 may act as an encryption key for the encryption module 760. For example, the PCM memories 752, 754, and 756 may store the encryption keys 770, 772, and 774 for the encryption module 760. For example, data written to the storage memory 762 may be encrypted as it is written to the storage memory 762. Similarly, encrypted data read from the storage memory 762 may be decrypted while it is fetched from memory. In such an embodiment, both encryption and decryption may be based on one or more encryption keys stored in the PCM memories 752, 754, and 756.

The encryption module 760 may be in communication with a memory storage module 762. The storage memory 762 may be any type of memory (e.g., PCM, dynamic random access memory (DRAM), flash, et cetera) or any combination thereof. The encryption module 760 may also be in communication with a data source. The encryption module 760 may, for example, receive data from the data source, encrypt the data, and store the encrypted data in the storage memory 762.

The memory system in accordance with the present disclosure may be accessible only locally (e.g., physical access on-site), only virtually (e.g., by way of a local area connection or internet connection), or some combination thereof. In some embodiments, a local-only connection may be preferred to prevent any virtual access as it may enable unauthorized remote access. In some embodiments, a virtual connection maybe preferred to enable remote access such as, for example, via a specifically authorized remote machine which may communicate with the memory system 700 via end-to-end encryption to enable the triggering of erasure of the memory system 700 based on a non-local event.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
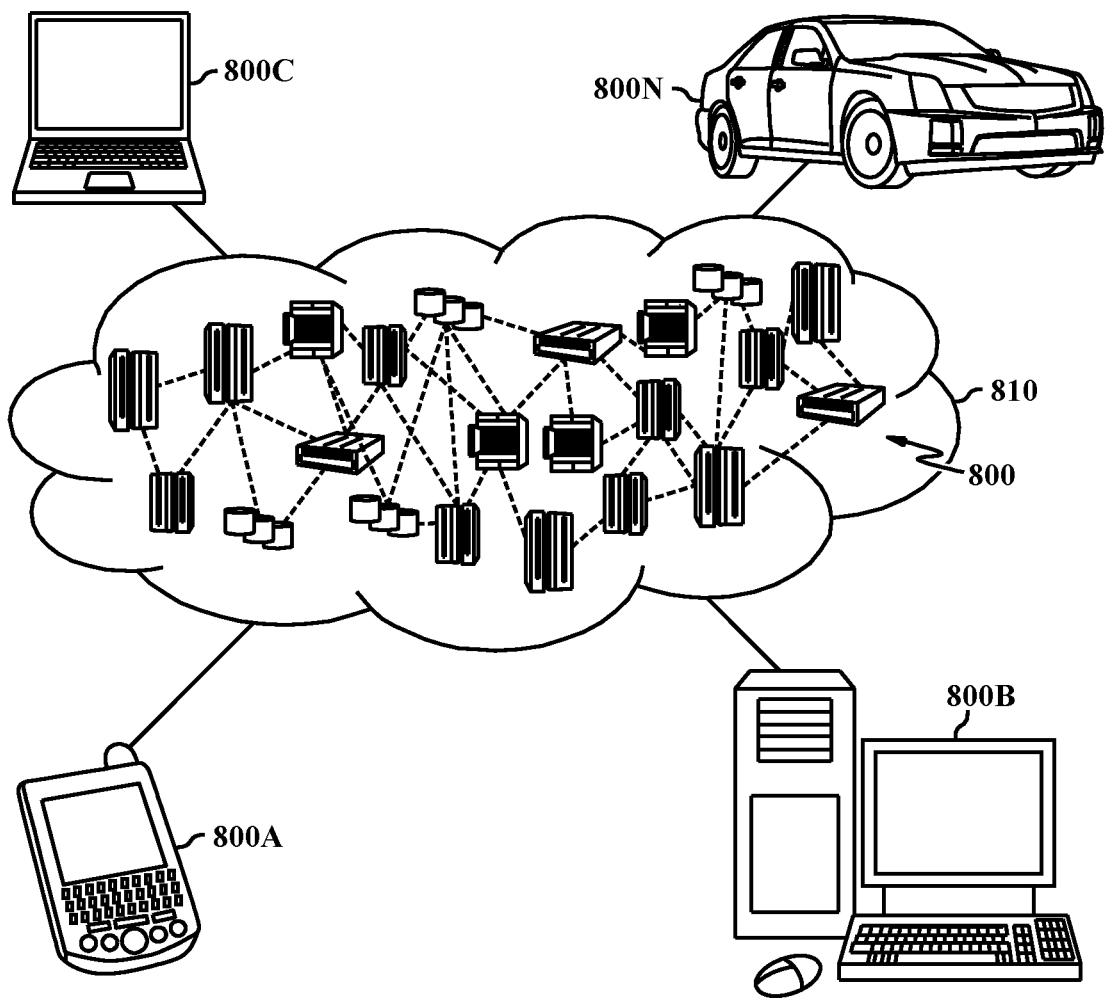
FIG. 8 illustrates a cloud computing environment, in accordance with embodiments of the present disclosure.

FIG. 8 illustrates a cloud computing environment 810 in accordance with embodiments of the present disclosure. As shown, cloud computing environment 810 includes one or more cloud computing nodes 800 with which local computing devices used by cloud consumers such as, for example, personal digital assistant (PDA) or cellular telephone 800A, desktop computer 800B, laptop computer 800C, and/or automobile computer system 800N may communicate. Nodes 800 may communicate with one another. They may be grouped (not shown) physically or virtually, in one or more networks, such as private, community, public, or hybrid clouds as described hereinabove, or a combination thereof.

This allows cloud computing environment 810 to offer infrastructure, platforms, and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
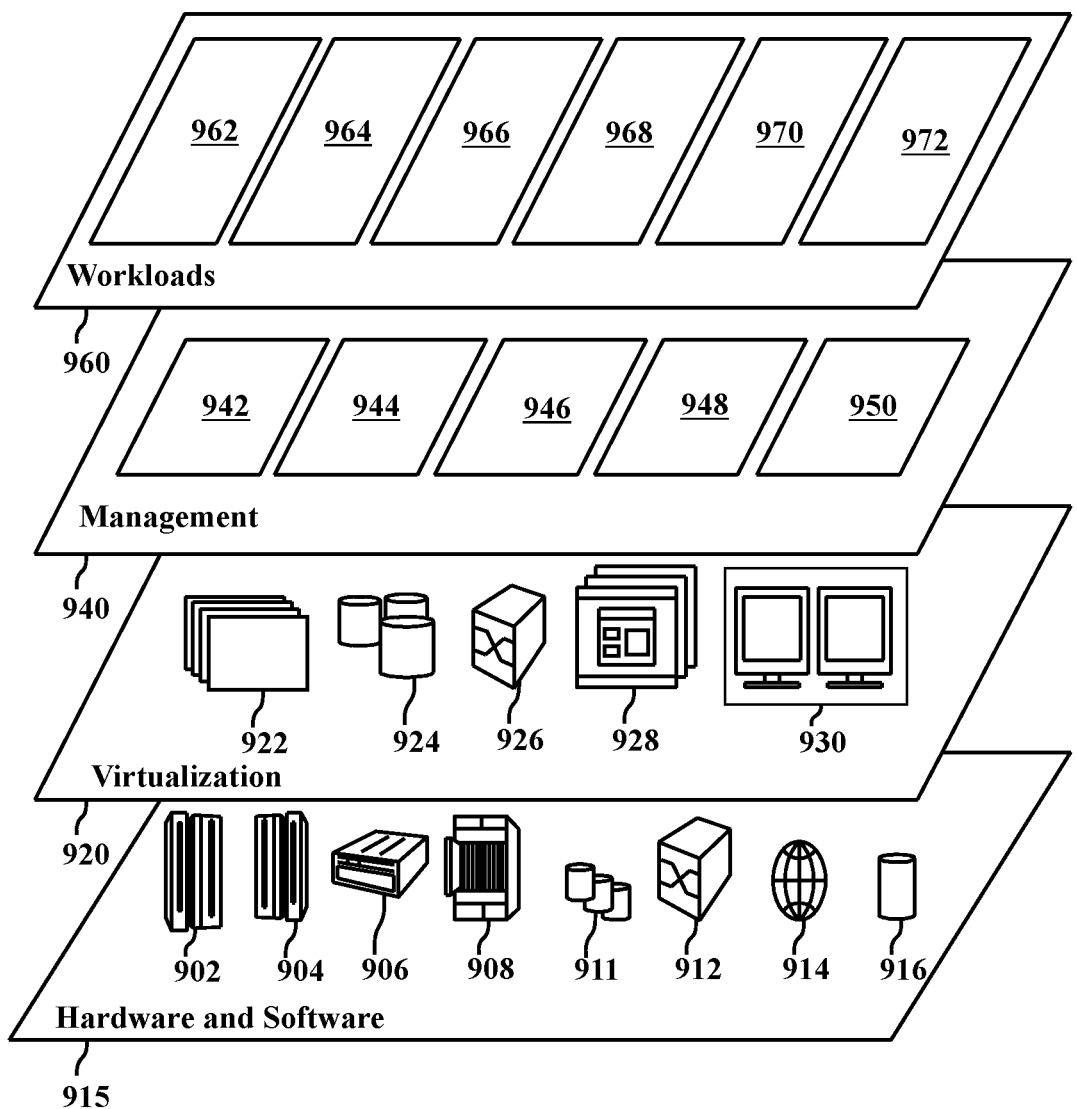
FIG. 9 depicts abstraction model layers, in accordance with embodiments of the present disclosure.

FIG. 9 illustrates abstraction model layers 900 provided by cloud computing environment 810 (of FIG. 8) in accordance with embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 915 includes hardware and software components. Examples of hardware components include: mainframes 902; RISC (Reduced Instruction Set Computer) architecture-based servers 904; servers 906; blade servers 908; storage devices 911; and networks and networking components 912. In some embodiments, software components include network application server software 914 and database software 916.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 940 may provide the functions described below. Resource provisioning 942 provides dynamic procurement of computing resources and other resources that are utilized to perform tasks within the cloud computing environment. Metering and pricing 944 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 946 provides access to the cloud computing environment for consumers and system administrators. Service level management 948 provides cloud computing resource allocation and management such that required service levels are met. Service level agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment may be utilized. Examples of workloads and functions which may be provided from this layer include: mapping and navigation 962; software development and lifecycle management 964; virtual classroom education delivery 966; data analytics processing 968; transaction processing 970; and one or more memory systems with erasure capability 972.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or which may be later developed.

Figure 10:
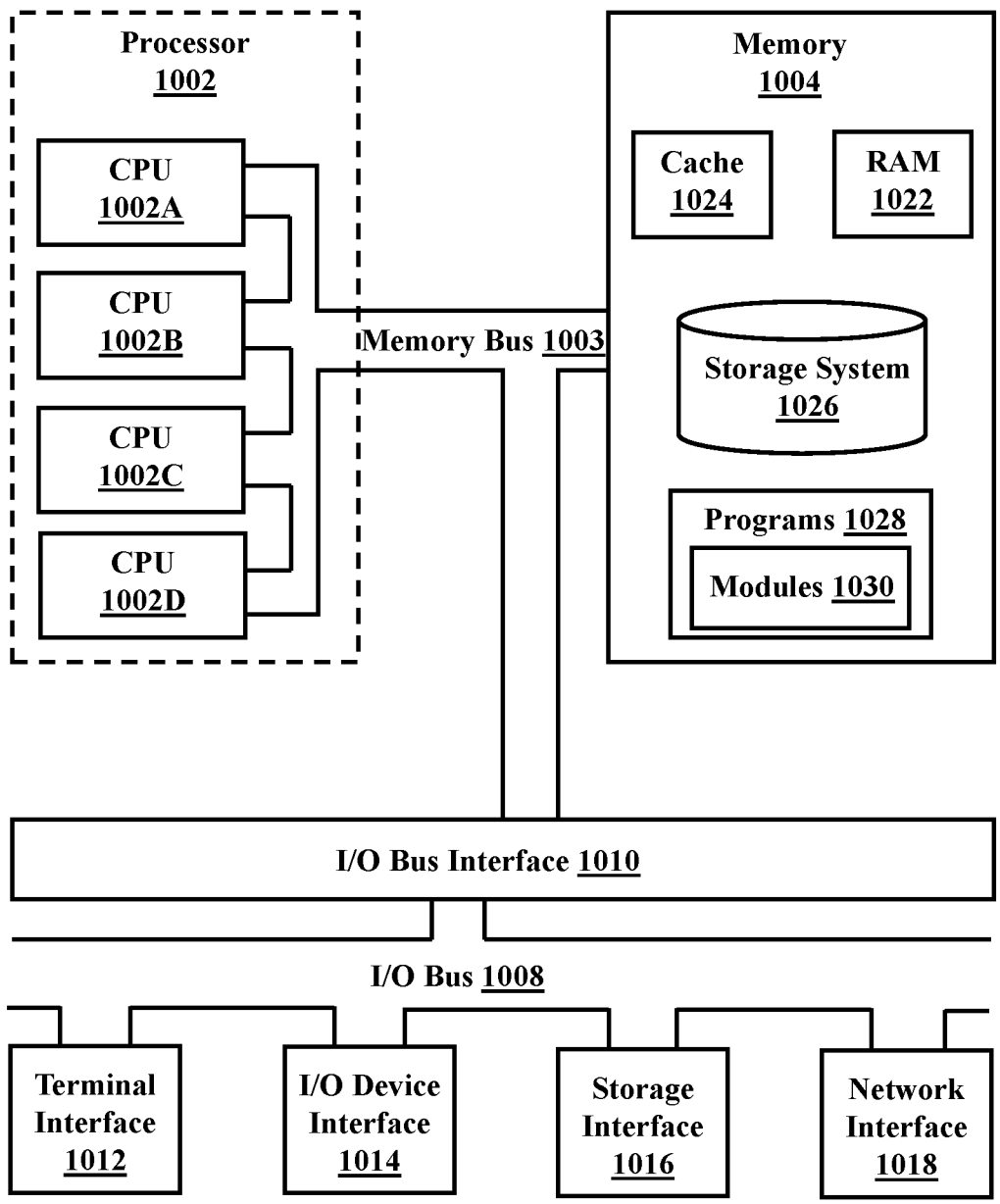
FIG. 10 illustrates a high-level block diagram of an example computer system that may be used in implementing one or more of the methods, tools, and modules, and any related functions, described herein, in accordance with embodiments of the present disclosure.

FIG. 10 illustrates a high-level block diagram of an example computer system 1001 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1001 may comprise a processor 1002 with one or more central processing units (CPUs) 1002A, 1002B, 1002C, and 1002D, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable CPUs 1002A, 1002B, 1002C, and 1002D, herein generically referred to as the CPU 1002. In some embodiments, the computer system 1001 may contain multiple processors typical of a relatively large system; however, in other embodiments, the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 830, may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units 1010 are shown, which separate the I/O bus 1008 from various communications paths running to the various I/O devices, in other embodiments some or all of the I/O devices may be connected directly to one or more system I/O buses 1008.

In some embodiments, the computer system 1001 may be a multi-user mainframe computer system, a single-user system, a server computer, or similar device that has little or no direct user interface but receives requests from other computer systems (clients). Further, in some embodiments, the computer system 1001 may be implemented as a desktop computer, portable computer, laptop or notebook computer, tablet computer, pocket computer, telephone, smartphone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A memory system, said system comprising:
a memory array wherein said memory array has a plurality of memory cells, wherein said plurality of memory cells store encryption data;
a heater integrated into said memory array between said plurality of memory cells; and
a processor in communication with said heater, wherein said processor notifies said heater to activate when a trigger event occurs.

2. The system of claim 1 wherein:
said plurality of memory cells are nonvolatile phase change memory cells.

3. The system of claim 2 wherein:
an activation of said heater heats at least a portion of said memory array and changes at least one of said non-volatile phase change memory cells from a first phase to a second phase.

4. The system of claim 3 wherein:
said first phase is an amorphous phase and said second phase is a crystalline phase.

5. The system of claim 1 further comprising:
a material separating said heater from said plurality of memory cells, wherein said material is thermally conductive and electrically insulating.

6. The system of claim 1 further comprising:
at least one package integrity sensor in communication with said processor.

7. The system of claim 1 further comprising:
a power source in communication with at least one of said processor and said heater.

8. The system of claim 1 wherein:
said processor is a tamper detection unit.

9. A computer system, said computer system comprising:
a storage memory;
a memory cluster, wherein said memory cluster comprises:
one or more heaters interdigitated between a plurality of memory cells, wherein said plurality of memory cells store one or more encryption keys for encrypting or decrypting data stored in said storage memory; and
a tampering detector in communication with said one or more heaters, wherein said tampering detector notifies said one or more heaters to activate when a tampering event occurs.

10. The system of claim 9 wherein:
said plurality of memory cells are nonvolatile phase change memory cells.

11. The system of claim 10 wherein:
an activation of said one or more heaters heats at least a portion of said plurality of memory cells and changes at least one of said nonvolatile phase change memory cells from a first phase to a second phase.

12. The system of claim 11 wherein:
said first phase is an amorphous phase and said second phase is a crystalline phase.

13. The system of claim 9 further comprising:
a material separating said heater from said plurality of memory cells, wherein said material is thermally conductive and electrically insulating.

14. The system of claim 9 further comprising:
at least one package integrity sensor in communication with said tampering detector.

15. The system of claim 9 further comprising:
a power source in communication with at least one of said one or more heaters and said tampering detector.

16. The system of claim 9 wherein said tampering event is an unauthorized removal of at least one of a memory system or its components.

17. A method for memory erasure, said method comprising:
monitoring, by a processor, a memory array, wherein said memory array has a plurality of memory cells, wherein said plurality of memory cells store encryption data;
determining that a trigger threshold is exceeded; and
heating, by said processor communicating with at least one heater, at least one of said plurality of memory cells, wherein the at least one heater is disposed between said plurality of memory cells.

18. The method of claim 17 wherein:
said at least one of said plurality of memory cells is a phase change memory cell.

19. The method of claim 18 wherein:
said heating anneals said phase change memory cell.

20. A computer program product for memory erasure, said computer program product comprising a computer readable storage medium having program instructions embodied therewith, said program instructions executable by a processor to cause said processor to perform a function, said function comprising:
monitoring, by said processor, a memory array, wherein said memory array has a plurality of memory cells, wherein said plurality of memory cells store encryption data;
determining that a trigger threshold is exceeded; and
heating, by said processor communicating with at least one heater, at least one of said plurality of memory cells, wherein the at least one heater is interdigitated between said memory cells.

21. The computer program product of claim 20 wherein:
said at least one of said plurality of memory cells is a phase change memory cell.

22. The computer program product of claim 21 wherein:
said heating anneals said phase change memory cell.

23. A method for manufacturing an integrated circuit, said method comprising:
forming a non-volatile memory cell on top of a first electrode, wherein said first electrode is embedded in a dielectric material;
forming a heater on top of a second electrode, wherein said second electrode is embedded in said dielectric material, and wherein said heater is proximate said non-volatile memory cell;
forming a first top electrode on top of said non-volatile memory cell; and
forming a second top electrode on top of said heater.

24. The method of claim 23 further comprising:
forming a material between said heater and said non-volatile memory cell wherein said material is thermally conductive and electrically insulating.

25. The method of claim 23 wherein:
said non-volatile memory cell is a phase change memory cell.

* * * * *